June 6, 1950 C. H. WOOD 2,510,848
MEANS ENABLING AIRCRAFT NIGHT-LANDING PRACTICE
TO BE CONDUCTED IN DAYLIGHT
Filed July 29, 1947
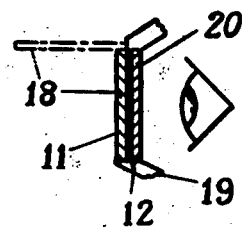
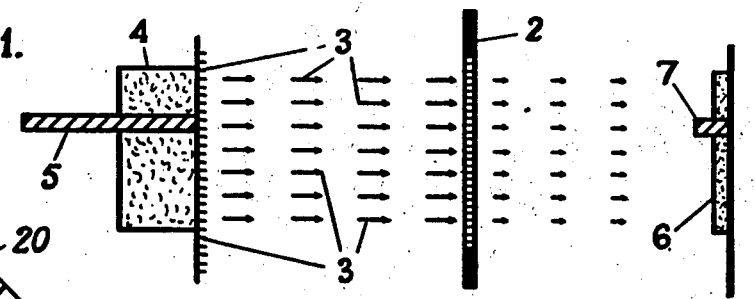
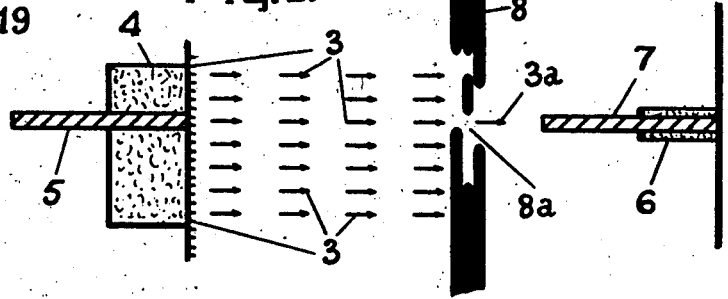
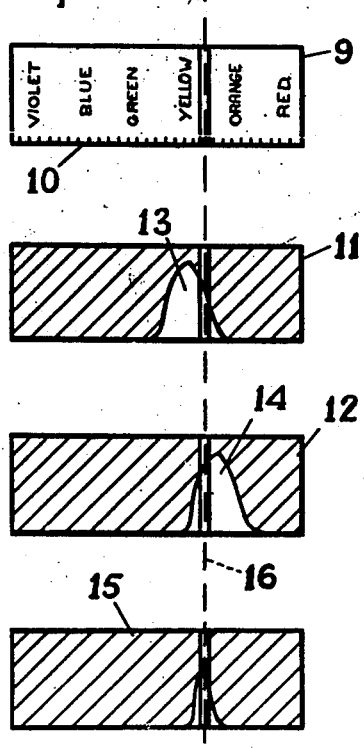
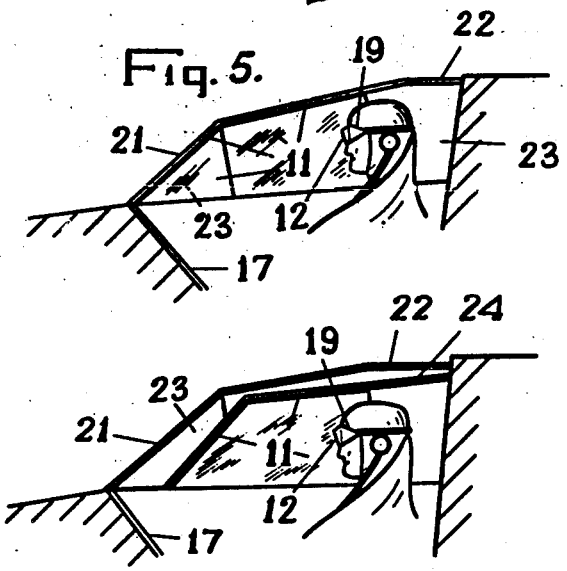

Patented June 6, 1950

2,510,848

UNITED STATES PATENT OFFICE 2,510,848

MEANS ENABLING AIRCRAFT NIGHT-LANDING PRACTICE TO BE CONDUCTED IN DAYLIGHT

Charles Harold Wood, Bradford, England

Application July 29, 1947, Serial No. 764,284
In Great Britain July 9, 1940

Section 1, Public Law 690, August 8, 1946
Patent expires July 9, 1960

17 Claims. (Cl. 35—12)

This invention relates to apparatus designed to enable aircraft night-landing practice to be conducted in daylight, such apparatus comprising some form of light-filter to cut-off daylight from the pilot or pupil, but to transmit the light from some distant light source. The most obvious method of restricting the light reaching the pilot is the use of very dense "dark glasses" of any colour, or of neutral colour; but if these glasses are dense enough to restrict daylight to a negligible amount, only intensely brilliant light can be seen by him at any great distance, i. e., the sun, direct or reflected, or brilliant focused light or searchlights directed towards him. As such neutral colour filters restrict all forms of light (daylight or artificial) almost to the same extent, it is only the intense brilliance of a focused light which enables a minute fraction of it to penetrate the filter.

It has been found possible by using a number of "absorption" filters intercepting light in succession and each capable of cutting off a specific range of wavelengths, to restrict the light reaching the pilot so that only one narrow band of known wave-length is transmitted freely. Daylight filtered by these "absorption" filters becomes virtually invisible because it contains so little light of that particular wave-length. Strong monochromatic light of that particular wave-length, however, remains visible.

According to the present invention, apparatus for practicing night-landing in daylight comprises one or more lamps emitting a strong light of a particular wavelength to form a flare path and/or to serve as other ground lights, and a compound light absorption filter, or a combination of separated filters, adapted to restrict daylight visibility to a negligible amount while allowing adequate visibility of the said lamp or lamps. Preferably, the light absorption filters have abruptly cut-off transmission bands of the spectrum having a common transmission overlap only at and near the strong emission wavelength of the said lamp or lamps. The said lamp or lamps may be monochromatic. The monochromatic lamps may be sodium-vapour electric discharge lamps, or other lamps producing brilliant light at the sodium wavelength.

The filters may be arranged in any convenient manner relatively to the pilot or pupil; e.g., one filter may be associated with all light entrances to that part of the aircraft within the vision of the pilot and another filter may be disposed so that all light reaching the eyes of the pilot or pupil must pass therethrough. One filter may be associated with the windscreen, or incorporated in a hood adapted to fit around and over the pilot or pupil, and another may be carried by goggles worn by him. Alternatively, filters may be arranged only on the windscreen or hood, or only on goggles worn by the pilot or pupil.

Referring now to the accompanying drawing in which an embodiment of the invention is shown—

Fig. 1 illustrates diagrammatically light passing through a neutral colour filter;

Fig. 2 illustrates diagrammatically light passing through a compound "absorption" filter;

Fig. 3 illustrates the absorption curves of the filter groups employed;

Fig. 4 shows two groups of filters located on the goggles;

Fig. 5 shows two groups of separated filters divided and located one on the goggles and one on the aircraft windscreen;

Fig. 6 shows a portable inner hood within the aircraft cockpit to receive one or both of the filter groups.

Referring to Fig. 1, 2 illustrates a neutral colour filter and its effect of reducing, in equal proportions, all the wavelengths 3 of daylight 4 and a light source comprising sodium light 5; the diagrams 6 and 7 show the relative volumes of daylight and sodium light which reach the observer's eye. It is apparent that the use of "neutral colour" filters is not suitable, due to the almost equal dimming of all wavelengths and the effect of minimizing the intensity of a given light source so that it is visible at only a very short distance. On the other hand the use of sodium lamps is eminently suitable due to their monochromatic property, i. e., the whole of the light is of one wavelength approximately 5890 A. U. Furthermore the sodium wavelength isolated is near the point of the spectrum at which the human eye possesses its greatest visual acuity. It will therefore be apparent that if suitable absorption filters are combined to suit given light conditions, daylight visibility may be restricted to a negligible amount, but a small "gap" may be provided in the compound filter which coincides with wave-lengths approximately 5890 A. U., and the sodium light will pass freely through. Fig. 2 shows the effect of a combination of absorption filters forming a compound filter 8 upon the wavelengths 3 of the daylight 4 and a sodium light source 5. Each of the filters in the combination withholds certain wavelengths so as to form a gap 8a which affords free passage for the wavelength band 3a of the sodium light 5. It will be seen that the volume of sodium light visible to the eye after filtration is relatively larger than the volume of daylight so visible. Daylight may therefore be so reduced as to obtain reasonable "night-time" darkness and yet leave sodium lamps visible a considerable distance away.

The compound filter must necessarily include several different dyes, each absorbing specific wavelengths; although it is immaterial whether all the filters are combined into one multiple filter, or, to provide other advantages, are used in two separate groups. The result is the same so far as invisibility of daylight and visibility of the special lamps are concerned. It has been found that certain filter dyes known commercially as "Ilford" colour filter dyes Nos. 204, 404 and 812 provides the required result. The employed arrangement of dyes is Nos. 404 and 812 approximately in the proportion of 1:1, and Nos. 204 and 812 in the same proportion giving a compound filter (or combination) of 404, 204 and 812 approximately in the proportion of 1:1:2.

In Fig. 3 is shown the absorption curves of two filter groups separately and in combination. The different wavelengths of visible light, which together combine to form white light, have each a different colour or shade of colour of their own as shown by the diagrammatic representation of the spectrum 9 which includes the wavelength scale 10. The light absorption filters each have abruptly cut off transmission bands of the spectrum and the transmission bands very slightly overlap at, and near, the wavelength of the monochromatic light. The filters are divisible into two groups, marked respectively 11 and 12. All the filters in group 11, singly or in multiples, allow short wavelength visibility of daylight subjects. The portion 13 shows approximately the light transmitted extending over a wavelength range of about 5,600 A. U. to 6,000 A. U. with maximum transmission at or near 5890 A. U. and allows visibility of greenish brown colour. All the filters in group 12, singly or in multiples, allow longer wavelength visibility. The portion 14 shows approximately the light transmitted extending over a wavelength range of approximately 5,800 A. U. to 6,200 A. U. with maximum transmission at or near 5890 A. U. and allows visibility of reddish brown colour. When the filter groups are combined as at 15 then visibility is allowed only close to the sodium wavelength line 16 (5890 A. U.).

The group of filters 11, 12 may be arranged as desired, for example all the filters may be applied in fixed relationship to a pilot's goggles but this has certain disadvantages particularly in rendering difficult the viewing of instrument panels 17. To remove this difficulty, a sodium lamp in the aircraft may be employed to illuminate the instrument panel. In Fig. 4 the filters are shown superposed partly on a hinged screen 18 of a pilot's goggles 19 and partly on the fixed screen 20; this enables the degree of visibility to be altered at will. Alternatively, as shown in Fig. 5, the filter group 11 may be associated with the windscreen 21, hood 22 and side windows 23 of the aircraft cockpit and only the group 12 associated with the goggles 19. The remaining transparent portions of the cockpit are blacked-out in any suitable manner. This latter arrangement may be further modified as shown in Fig. 6 wherein the filter group 11 is associated with an inner screen and hood 24, the remaining portion of which excludes daylight and affords a clear view of the instrument panel 17. If desired the filter 11 may be on the windscreen 21, hood 22 and windows 23 and the filter 12 on the inner screen and hood 24. The order of the filters may be reversed in any of the above arrangements and such filters can be in alternative interchangeable densities to suit varying conditions and stages of training. Goggles of the above type shown in Fig. 4 may have filters of only one group thereon and the filter density may be varied at will by the adjustment of the hinged filter 11. A large range of densities can be provided by alternative goggles and hood and windscreen panels so that any degree of daylight-darkness can be produced easily on different types of days.

By arranging only one group, or none, of the filters on the goggles, easy visibility of the instrument panel is afforded by lighting it with light which renders it visible to the pilot or pupil. If the filters in group 12 are provided on the goggles, daylight may be admitted to the cockpit to fall only onto the instruments or suitable artifical lighting employed.

Sodium-vapour electric discharge lamps, or other lamps producing brilliant light at the sodium wavelength, may be arranged in parabolic or other suitable reflectors to form a "flare path" on an aerodrome. The said lamps could also be used as other ground lights. Such lamps would appear bright to a pilot using the above filters, who, at the same time, would be unable to see daylight-illuminated detail on the ground.

The simplicity and economy of sodium-vapour electric discharge lamps makes them eminently suitable for use as a main line of "landing flares" although "homing" beacons may comprise a source of intensely brilliant white light.

What I claim and desire to secure by Letters Patent is:

1. Apparatus for practicing night-flying aircraft in daylight comprising a compound light absorption filter including separated light absorption filters of different and substantially complementary wavelength-absorption characteristics to be associated respectively with an aircraft and a pilot therein, said filters being located in series in an aircraft pilot's line of sight to the exterior of the aircraft and one of said filters being outside of the pilot's line of sight to instruments within the aircraft, thereby to restrict exterior daylight vision of an aircraft pilot to a negligible amount while allowing adequate interior visibility of illuminated instruments for his guidance in accurate flying.

2. Apparatus according to claim 1, wherein one of the light filters is associated with at least some of the light entrances to that part of the interior of an aircraft within the vision of the pilot and another filter is disposed so that all light reaching the eyes of the pilot must pass therethrough.

3. Apparatus according to claim 1, wherein one of the component filters is associated with an inner screen within at least some of the light entrances of an aircraft structure within the vision of the pilot.

4. Apparatus according to claim 1 wherein said separated filters are of a greenish brown color and a reddish brown color respectively when viewed by daylight separately, the brown colored ingredient in the said filters being a monochromatic dye having optimum spectral transmission at approximately 5,890 A. U.; whereby sodium lights at the exterior of the aircraft are visible to the pilot through said serially located filters.

5. Apparatus according to claim 4, wherein the filters are arranged with the reddish brown component nearest the eyes of a pilot for affording easy visibility of the cockpit instruments and for the better retention of night-vision in respect of external lights.

6. In apparatus for practicing night-landing of aircraft in daylight and comprising at least one lamp in the landing area for emitting at least one beam of light which is especially strong around particular wavelengths and light filter means to be employed on an aircraft to control the wavelengths of light reaching the pilot's eyes from the exterior and from the interior of the aircraft, respectively; a compound light absorption filter comprising two filter sections with different transmission bands of the spectrum which have in common only substantially said particular wavelengths, means for supporting one filter section in the line of a pilot's vision of the landing area, and means for supporting the other filter section in the path of light reaching the eyes of the pilot both from the interior of the aircraft and through the first filter section, thereby to restrict exterior daylight vision of an aircraft pilot to a negligible amount while allowing adequate exterior visibility of said lamp and interior visibility of brilliantly illuminated instruments for his guidance in accurate flying.

7. In apparatus for practicing night landing of aircraft in daylight, the invention according to claim 6, wherein at least one filter section is embodied in an eye covering worn by the pilot such as to exclude the admission of any unfiltered daylight.

8. The invention according to claim 6, wherein at least part of said compound filter is worn by the pilot and comprises superposed layers of different transmissions, and means supporting one filter layer for displacement into inoperative position temporarily at the will of the pilot.

9. Apparatus according to claim 6, wherein the compound light absorption filter is associated with at least some of the light entrances of an aircraft structure within the vision of the pilot.

10. Apparatus according to claim 6, wherein the compound light absorption filter is associated with an inner screen within at least some of the light entrances of an aircraft structure within the vision of the pilot.

11. In apparatus for practicing night-landing of aircraft in daylight and including at least one monochromatic lamp in the landing area and filter means to be employed in an aircraft; a compound light absorption filter comprising filters with different abruptly cut-off transmission bands of the spectrum and having a common transmission overlap only at and near the effective wavelengths of said monochromatic lamp, said filters being mechanically separate for spacing to position both in series in an aircraft pilot's view of the landing area and to only one between the pilot and the cockpit instruments of the aircraft, thereby to restrict exterior daylight vision of an aircraft pilot to a negligible amount while allowing adequate exterior visibility of said monochromatic lamp and interior visibility of cockpit instruments when brilliantly illuminated by lighting which has a sufficiency of light around those wavelengths the most freely transmitted by the said compound filter.

12. In apparatus for practicing night-landing of aircraft in daylight and including at least one monochromatic lamp in the landing area; the combination of separated light absorption filters associated respectively with an aircraft and a pilot therein, said filters having different abruptly cut-off transmission bands of the spectrum and having also a common transmission overlap only at and near the effective wavelengths of said monochromatic lamp, whereby said filters may be positioned in spaced relation to restrict exterior daylight vision of an aircraft pilot to a negligible amount while allowing adequate exterior visibility of said lamp and interior visibiltiy of illuminated instruments for his guidance in accurate flying.

13. In apparatus for practicing night-landing of aircraft in daylight and comprising at least one lamp in the landing area for emitting a strong light of wavelength between 5,800 A. U. and 6,000 A. U. regardless of other wavelength emissions; two light absorption filters which are used substantially in a complementary sense, said filters being formed to transmit only light of a wavelength approximately 5,600 A. U. to 6,000 A. U. in the one instance and approximately 5,800 A. U. to 6,200 A. U. in the other instance with maximum transmission in each case at or about 5,890 A. U., whereby the location of only one filter between the pilot and instruments in the aircraft cockpit and of both filters between the pilot and the landing area serves to restrict daylight vision of a pilot in an aircraft while allowing adequate visibility of said lamp on the landing area and of suitable illuminated instruments in the aircraft cockpit.

14. In apparatus for practicing night-landing in daylight with a lamp at the landing area emitting a beam which is especially strong in the wavelength band of from 5,800 to 6,000 A. U., and for use with a complementary filter to provide an overall transmission restricted substantially to said band of wavelengths, a light absorbing filter having a band pass transmission including said band of from 5,800 to 6,000 A. U. and a sharp cut-off at and adjacent one side of said band of wavelengths.

15. The invention as recited in claim 14, wherein said light absorbing filter includes two elements of different wavelength - transmission characteristics.

16. The invention as recited in claim 14, wherein said filter comprises goggles to be worn by a pilot and having a band pass which includes and extends above said band of wavelengths.

17. The invention as recited in claim 14, wherein said filter comprises a sheet of light absorbing material to be mounted in the cockpit of an aircraft, said sheet having a band pass transmission including and extending below said band of wavelengths.

CHARLES HAROLD WOOD.

REFERENCES CITED

The following references are of record in the file of this patent:

UNITED STATES PATENTS

| Number | Name | Date |
| --- | --- | --- |
| 2,280,358 | Tietig | Apr. 21, 1942 |
| 2,403,195 | Ross | July 2, 1946 |

OTHER REFERENCES

Aero Digest, page 295, July 1943.